United States Patent
Wulf et al.

(10) Patent No.: US 7,347,457 B2
(45) Date of Patent: Mar. 25, 2008

(54) HOSE CONNECTION PIECE, A HOSE COUPLING AND A HOSE FITTING HAVING A HOSE CONNECTION PIECE

(75) Inventors: Johannes Wulf, Anroechte (DE);
Georg Weiland, Meinerzhagen (DE);
Frank Schmitt, Meinerzhagen (DE)

(73) Assignee: Schieffer GmbH & Co., Lippstadt (DE)

( * ) Notice: Subject to any disclaimer, the term of this patent is extended or adjusted under 35 U.S.C. 154(b) by 195 days.

(21) Appl. No.: 11/055,451

(22) Filed: Feb. 10, 2005

(65) Prior Publication Data

US 2006/0131878 A1   Jun. 22, 2006

(30) Foreign Application Priority Data

| Feb. 10, 2004 | (DE) | ................. 20 2004 001 987 U |
| Apr. 26, 2004 | (DE) | ..................... 10 2004 020 474 |
| Apr. 26, 2004 | (DE) | ................. 20 2004 006 631 U |
| Aug. 27, 2004 | (EP) | ................................. 04020451 |

(51) Int. Cl.
    *F16L 33/00*   (2006.01)
(52) U.S. Cl. ..................... 285/256; 285/239; 285/242
(58) Field of Classification Search ............... 285/256, 285/239, 242
See application file for complete search history.

(56) References Cited

U.S. PATENT DOCUMENTS

| RE20,629 | E  | * | 1/1938 | Eisenman .................... 285/256 |
| 2,273,398 | A | * | 2/1942 | Couty et al. ............. 285/222.3 |
| 2,460,653 | A | * | 2/1949 | Raybould ................... 285/249 |
| 4,018,462 | A |   | 4/1977 | Saka et al. |
| 4,296,955 | A | * | 10/1981 | Martin .................... 285/381.1 |
| 4,498,691 | A | * | 2/1985 | Cooke ......................... 285/12 |
| 5,267,758 | A |   | 12/1993 | Shah et al. |
| 5,317,799 | A | * | 6/1994 | Chapman et al. ............. 29/508 |
| 5,344,196 | A |   | 9/1994 | Kozuka et al. |
| 5,382,059 | A | * | 1/1995 | Wilson ....................... 285/256 |
| 5,685,576 | A | * | 11/1997 | Wolfe et al. ............ 285/148.8 |
| 6,523,862 | B1 | * | 2/2003 | MacDuff .................... 285/256 |
| 6,874,823 | B2 | * | 4/2005 | Viegener ................... 285/256 |

(Continued)

FOREIGN PATENT DOCUMENTS

DE            69229582          3/2000

(Continued)

Primary Examiner—Aaron Dunwoody
Assistant Examiner—Fannie C. Kee
(74) Attorney, Agent, or Firm—Dilworth & Barrese, LLP

(57) ABSTRACT

A hose connection piece is disclosed having a region for the reception of a hose end, wherein a peripheral sealing groove is provided on the outer side of the hose connection piece for the sealing of the hose connection. Also disclosed is a hose coupling having a hose connection piece, having a press-fit holder and having an insert, wherein the insert rests in the press-fit holder, wherein—the assembly case—the insert and the press-fit holder enclose the hose connection piece with the hose end pushed thereon, wherein—in the securing case—the insert holds the hose, wherein the hose connection piece can be moved from the assembly case into the securing case by application of external, radial pressure and wherein the length change of the insert on the transition from the assembly case into the securing case is lower than that of the holder. Further disclosed is a hose fitting having a hose connection piece having a hose coupling.

30 Claims, 3 Drawing Sheets

U.S. PATENT DOCUMENTS

2002/0158468 A1  10/2002  Ikegami et al.

FOREIGN PATENT DOCUMENTS

| DE | 10062141 | | 6/2001 |
|---|---|---|---|
| GB | 2177769 A | * | 1/1987 |
| GB | 2199100 | | 6/1988 |
| GB | 2220242 A | * | 1/1990 |
| WO | WO 9415135 A1 | * | 7/1994 |
| WO | 97/04266 | | 2/1997 |

* cited by examiner

HOSE CONNECTION PIECE, A HOSE COUPLING AND A HOSE FITTING HAVING A HOSE CONNECTION PIECE

BACKGROUND OF THE INVENTION

The present invention relates to a hose connection piece having a region for the reception of a hose end and to a hose coupling and to a hose fitting having such a hose connection piece.

Such hose connection pieces, hose couplings and hose fittings are used widely in the most varied sectors. One area of application is the use of hose fittings as hydraulic fittings such as are used with construction machinery.

Hose connection pieces are usually designed as hose nipples or as hose nozzles with a section for the fixing of the hose end. To withstand peak loads and high pulsed loads, the hose end is as a rule pressed onto the hose connection piece.

A disadvantage with the hose connection pieces used today consists of the fact that leaks and the known "sweating", i.e. the occurrence of liquid at the hose connection piece and the subsequent failure of the hydraulic lines can occur after longer use.

One reason for this is that the hydraulic medium, for example hydraulic oil, migrates between the hose connection piece, that is the hose nipple, for example, and the inner hose core under the pulse pressure and is then discharged at the hose end. As the time of use of the hose increases, the probability grows that the hose fails for this reason. The reasons for the said leak can be fatigue phenomena of the inner hose core and also the formation of cracks in the inner core of the hose in the region of the link.

SUMMARY OF THE INVENTION

It is therefore the object of the present invention to further develop a hose connection piece of the initially named kind such that its sealing properties are improved.

This object is solved by a hose connection piece hose coupling and hose fitting having the features herein. Accordingly, at least one peripheral sealing groove or sealing notch is provided at the outside of the hose connection piece to seal the hose connection. A special design of a sealing edge results in this region by the application of such a sealing groove on the pressing/making up of the hose. The hose material flows into the sealing groove and—in accordance with the effect of an O ring seal, for example—prevents the passage of the hydraulic medium, i.e., of the hydraulic oil.

It is generally possible for not only one of the said sealing grooves, but two or more than three of the said sealing grooves to be provided for the sealing of the hose connection.

The hose connection piece can, for example, be a hose nozzle or a hose nipple.

In a preferred aspect of the invention, a sealing groove is located in the region of the end of the hose connection piece at which the hose is pushed onto the hose connection piece. It can thereby be effectively prevented that the hydraulic medium can penetrate into the further region of the pressing at all. A further important advantage of the arrangement of the sealing groove in the region of the pushing-on end of the hose connection piece lies in the fact that it can be achieved by such an arrangement that the forces acting on the hose connection piece on the pressing of the hose extend essentially in a radial direction and not in an axial direction. It is particularly advantageous for only low axially active forces or no axially active forces to act on the hose on the pressing of the hose in the region of the sealing groove, since this can result in damage or to crack formation in the hose material and, furthermore, in a defective seating of the hose material in the sealing groove.

It must be pointed out that the sealing groove does not have to be located in the region of the end of the hose connection piece over which the hose is pushed on. Generally one or more sealing grooves can also be arranged in the other end region of the hose connection piece or at another point. It is particularly advantageous for the sealing groove or for the sealing grooves to be arranged in quiescent or largely quiescent zones, that is in zones where no axial strains or axial strains which are as low as possible result. In this manner, the desired sealing effect can be achieved in a particularly advantageous manner.

The said forces acting in the axial direction are usually caused by the press-fit holder which does not only move in the radial direction, but additionally in the axial direction on pressing, whereby the aforesaid axially acting forces are also applied onto the hose which can result in the named damage to the hose.

Accordingly, a particularly advantageous aspect of the invention consists of the fact that the hose is pressed onto the hose connection piece by a press-fit holder, with the sealing groove being arranged relative to the press-fit holder such that the sealing groove is located in a region in which the press-fit holder exerts no forces or only low forces on the hose acting in the axial direction of the hose connection piece.

It is particularly advantageous for the sealing groove to be provided in a region of the hose connection piece which is cylindrical in design on its outside. A special design of the sealing edge or an O ring sealing effect can be obtained in this region on the pressing/making up of the hose by such an especially designed region of the hose connection piece (cylindrical, absolutely round, non-sectioned design).

A conically tapering end region of the hose connection piece can adjoin the cylindrical region and the hose end is pushed over it. Generally, another design can also be provided instead of a conical end region, for example a cylindrically designed end region.

The region for the reception of the hose end can have a section for the fixing of the pushed-on hose end and have a region adjacent thereto in which the sealing groove is provided for the sealing of the hose connection.

Provision can furthermore be made for the region in which the sealing groove is arranged to be provided between the region which has the section for the fixing of the pushed-on hose end and the end region of the hose connection piece at which the hose is pushed onto the hose connection piece.

The region having the sealing groove can thus be located between the push-on end of the hose connection piece and the region having the section.

In a preferred aspect of the invention, the sealing groove has two substantially parallel walls. These walls extend parallel to one another in the peripheral direction around the hose connection piece. Provision can be made for the walls to extend perpendicular or substantially perpendicular to the surface of the region of the hose connection piece in which the sealing groove is arranged. Different section shapes are naturally also feasible, for example with walls extending at an angle or combinations of such walls.

The sealing groove can have a substantially U-shaped cross-section.

Provision can furthermore be made for the depth and width of the sealing groove to coincide or to substantially correspond to one another. It is equally feasible for the depth of the sealing groove to exceed the width or for the width of the sealing groove to exceed the depth. The dimensioning of the depth and width in absolute terms and relative to one another substantially depends on the planned area of use.

The present invention furthermore relates to a hose connection piece having a hose end pressed onto the hose connection piece, with the hose material of the hose end having flowed into the sealing groove of the hose connection piece. The hose material, preferably rubber material, flows into the sealing groove and thus forms an effective sealing edge which effectively prevents the passage of the conveyed medium.

The present invention furthermore relates to a hose coupling having a hose connection piece comprising a press-fit holder and an insert, wherein the insert rests in the press-fit holder, the insert and the press-fit holder enclose the hose connection piece with the hose end pushed thereon in the assembly case, the insert holds the hose in the securing case, the hose coupling can be moved from the assembly case into the securing case by application of an external, radial pressure and the length change of the insert is lower than that of the holder on the transition from the assembly case to the securing case.

It can likewise be effectively prevented by such a measure that larger axial movements occur in the region of the sealing groove of the hose connection piece or that larger axial forces act on the hose. The insert prevents the length change of the holder being completely transferred to the hose. A relative movement rather results between the holder and the insert, wherein the insert undergoes a comparatively low axial extension and in this manner protects the hose from unwanted axially acting forces. It is thus possible for the hose material to penetrate radially into the sealing groove on pressing and undergo, at least in this region, no axial forces or only low axial forces. A very good seating of the hose material in the sealing groove is realized in this manner.

The hose connection piece can be a tubular coupling element which can be connected at one end to a fitting and at the other end to a hose nipple for a hose. The press-fit holder can be cylindrical in shape.

In a preferred aspect of the invention, an end of the coupling element consists of a ribbed hose nipple onto which the hydraulic hose to be connected is pushed. The coupling element can be connected to a fitting at the other end. For the assembly, the insert can be pushed into the press-fit holder and both can be guided over the hose nipple. Both parts can flow independently of one another in the longitudinal direction during pressing by the separation of the insert from the press-fit holder.

It is particularly advantageous for the material amount of the insert to be pressed to be smaller than that of the press-fit holder. The radial volume change caused by the compression of the insert is thus only compensated by an extremely low longitudinal length change. In contrast, the press-fit holder, which is substantially more stable in design in order to withstand the inner pressure, can change its length on compression independent of the hose holding means.

In a further advantageous aspect of the hose coupling in accordance with the invention, the one-part insert has a substantially lower wall thickness than the press-fit holder. The task of the insert is only to fix the hydraulic hose in the holder, whereas the press-fit holder itself provides the stability of the hose coupling.

In a further advantageous aspect of the hose coupling in accordance with the invention, the insert is not designed in one part, but in multiple parts. In this process, a plurality of cylinder sections are feasible which each have individual hose holding means. It is also feasible to use spirally bent material such as a spiral spring as the insert. No real longitudinal length change would also arise here due to the low material amount.

In a further advantageous embodiment of the hose coupling in accordance with the invention, the insert could also consist of a net-like material which is pressed into the net of the hydraulic hose. Only very little material would also be pressed through the cut-out in the wire net so that the aforesaid disadvantages would not occur.

Further advantageous embodiments of the invention are the subject herein.

The present invention furthermore relates to a hose fitting having a hose connection piece in accordance with the invention or having a hose coupling in accordance with the invention. A hose fitting is understood as any component such as valves, branches, angles, reducers, pumps, etc. which has or can be connected to a hose connection piece.

BRIEF DESCRIPTION OF THE DRAWINGS

Further details and advantages of the invention will be explained in more detail with reference to an embodiment shown in the drawing.

FIG. 4: a sectional drawing through the different elements of the hose coupling in accordance with the invention;

DESCRIPTION OF THE PREFERRED EMBODIMENTS

Figure 1:
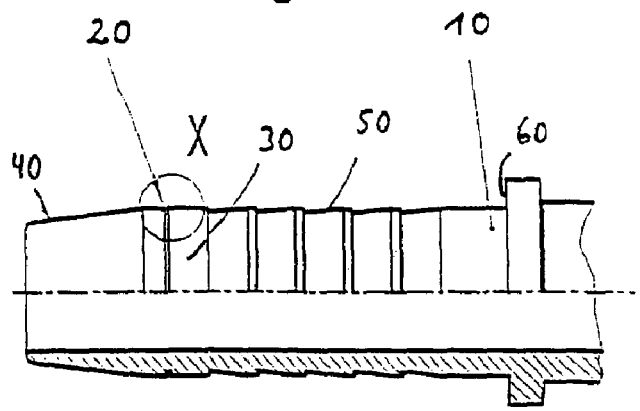
FIG. 1: a partly sectioned side view of the hose connection piece in accordance with the invention.

FIG. 1 shows, in a partly sectioned representation, the hose connection piece 10 for the reception of a hose end. It has a conically tapering end region 40 over which the hose end is placed. The region 30, which has a cylindrical smooth surface and in which the sealing groove 20 is provided, adjoins it. The nipple section 50, which consists of a plurality of sequentially arranged conically tapering sections for the improved fixing of the hose end, adjoins the region 30. The hose connection piece 10 furthermore has the stop 60 to fix the end position to the pushed-on hose. Different sections or, optionally, a non-sectioned region are also feasible instead of the said nipple profile.

As can be seen from FIG. 1, the sealing groove 20 is located in the half facing the push-on end and preferably in the third of the hose connection piece 10 including the push-on end.

It is generally also possible additionally or alternatively to arrange the sealing groove in other regions of the hose connection piece. It is, for example, also feasible to arrange the sealing groove in the region between the stop 60 and the start of the nipple section 50. It is generally possible to arrange the sealing groove or sealing grooves in the quiescent zones, that is in zones of no axial strain of the hose or of axial strain of the hose which is as low as possible, since a particularly good sealing effect can be achieved in this manner. This applies independently of whether a press-fit holder with or without insert is provided.

It is thus feasible for a further sealing groove to extend in the region between the stop 60 and the nipple section 50 in addition to the sealing groove 20 shown in FIG. 1. More than two sealing grooves can naturally also be arranged.

Figure 2:
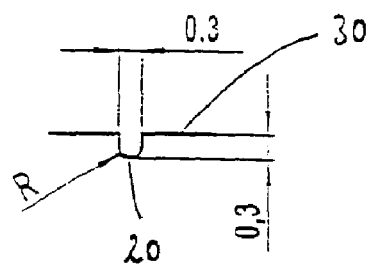
FIG. 2: a representation of the detail X in FIG. 1.

The sealing groove 20 is arranged peripherally and has a U-shaped cross-sectional section, as can be seen from the detail illustration X in accordance with FIG. 2. As further results from the dimensions in accordance with FIG. 2, the depth and width of the sealing groove 20 are identical. In the embodiment shown here, they each amount to 0.3 mm. Dimensions differing therefrom and different size relationships between the width and depth of the sealing groove 20 are naturally also feasible. It is, for example, feasible for the depth of the sealing groove to exceed its width.

The hose connection piece 10 consists of metal or of plastic and has a circular cross-section.

Figure 3:
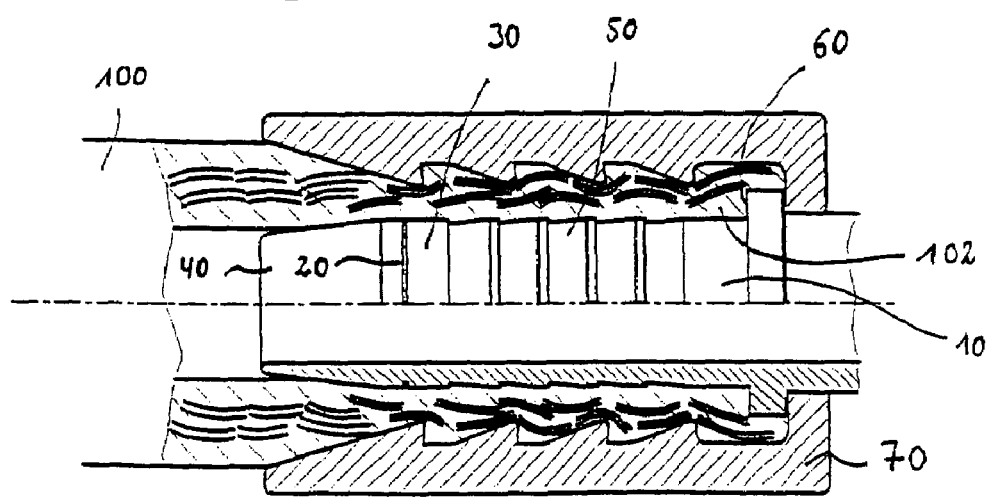
FIG. 3: a representation of the hose connection piece in accordance with FIG. 1 with a pressed hose end.

FIG. 3 shows the hose connection piece 10 with the hose end 102 of the hose 100 pushed thereon and pressed by means of the press-fit holder 70. The hose end 102 abuts the stop 60 and surrounds it due to the pressing in the peripheral direction. The pressing of the hose end 102 does not only have the effect that the hose material contacts the nipple section 50, but also that the rubber material of the hose flows into the sealing groove 20 and thus prevents the conveyed medium, for example hydraulic oil, from being able to penetrate into the region of the nipple section 50. A sealing edge/O ring is formed in the corresponding region of the hose material by the pressing/making up of the hose on the basis of the sealing groove 20, whereby an effective seal is achieved.

The service life of the hose line is substantially lengthened by this sealing effect and one of the main causes for the failure of hose lines, particularly under high pulsed strain, is considerably reduced, if not completely precluded. There are no limitations with respect to the hose connection piece used or the hose fitting used. The aforesaid improvements can be achieved with all hose connection pieces/fittings. The present invention can have particular importance in construction machinery or units with high pulse strain and peak strain, such as small excavators, injection molding machinery, etc.

The components of the hose coupling 10' in accordance with the invention are shown in FIG. 4. It consists, first, of a hose connection piece or coupling element 20'. It is a tubular assembly which has a ribbed hose nipple 22' at its rear end 26', with the hydraulic hose 50' being able to be pushed onto said hose nipple. To fix the hose nipple 22' in the inner hose 53' of the hydraulic hose 50', the nipple 22' has ribs 27'. They are trapezoidal, radially peripheral ribs which hold the coupling element with a mating inner diameter of the hose. The hose nipples is hollow at the interior to forward the hydraulic fluid or other liquids which flow through the connected hose. A connection nut is attached to the front end 25' of the coupling element. It can be used to connect the coupling element 20' to a fitting (not shown). An external hexagon 21' is shown by way of example here which has an internal thread at its interior. In the case shown here, the coupling element is made in two parts. In assembly, the push-on nut 21' is guided from the rear end 26' over the hose nipple onto the front part of the coupling element. The push-on nut 21' is then secured by an abutment flange 24' formed as a push-on part.

Figure 4A:
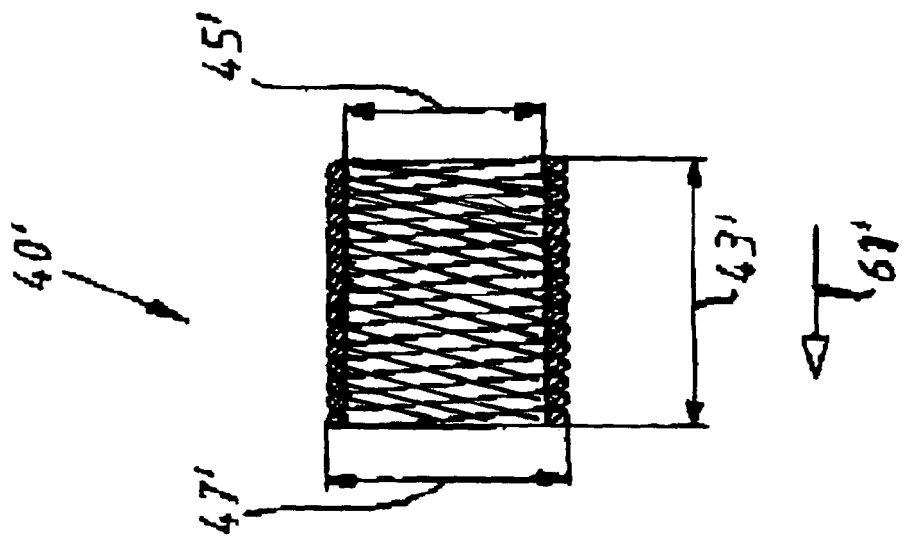
FIGS. 4A and 4B illustrate, respectively, an insert having a spiral spring and a lattice.
Figure 4B:
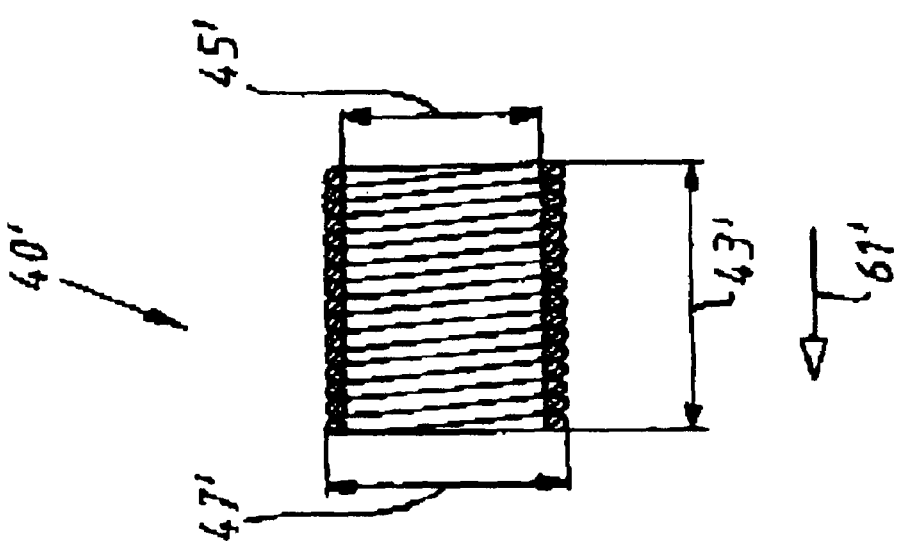
Figure 6:
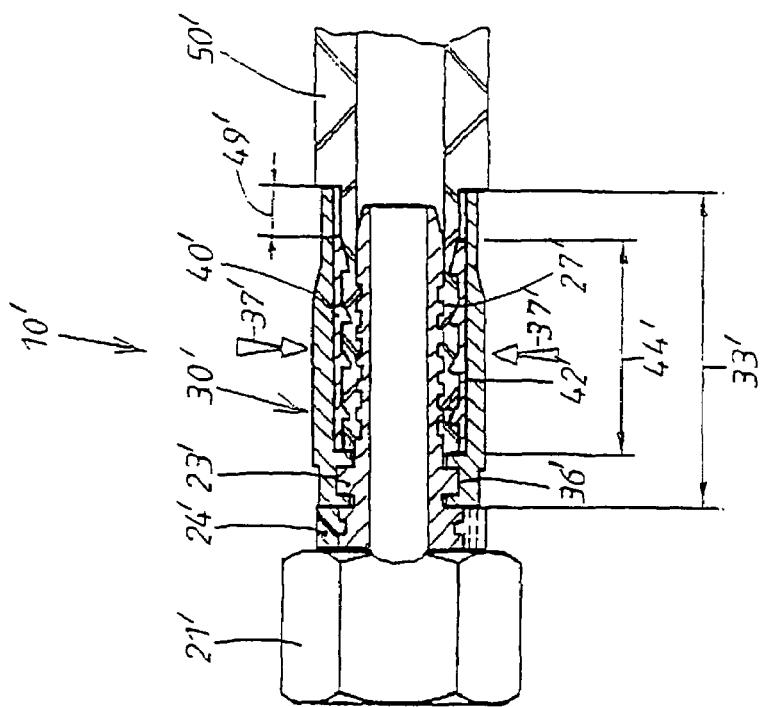
FIG. 6: the arrangement of the different elements of the hose coupling in accordance with the invention in the securing case.
Figure 5:
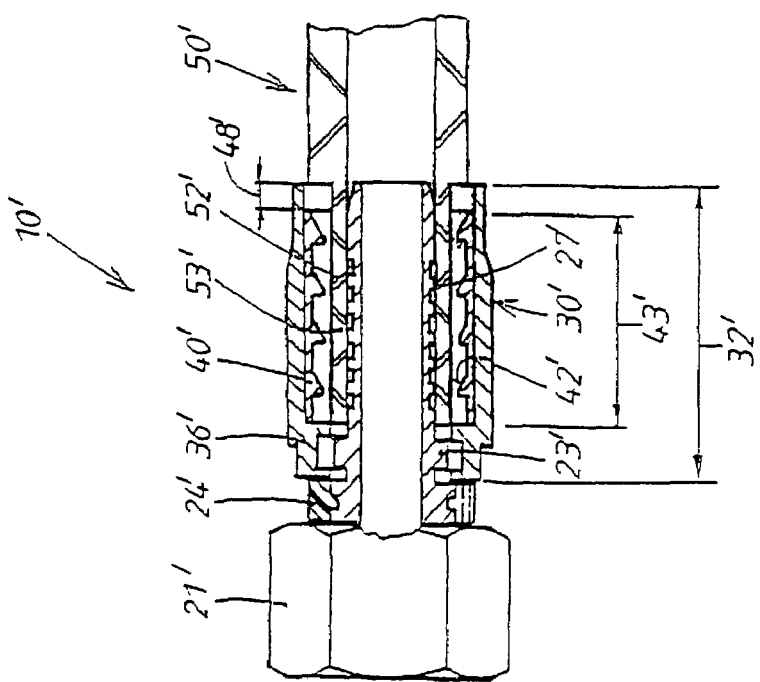
FIG. 5: the arrangement of the different elements of the hose coupling in accordance with the invention in the assembly case.

A sealing groove, not shown in FIGS. 4 to 6, such as is disclosed by way of example in FIGS. 1 to 3, is located peripherally on the hose connection piece 20', preferably in its end region 26'. The sealing groove can be located in a region covered by the insert 40' or also be offset with respect to it.

The next component, of which the hose coupling 10' accordance with the invention is made up, is the press-fit holder 30'. It consists of a cylindrical section having a diameter 38' with a cylinder-like internal hollow space. The external contour of the press-fit holder 30' can depend on the respective area of application. It is thus completely feasible to select a round cross-section or a polygonal one. A notch 36' is located at the interior on that end of the press-fit holder 30' which is pushed over the hose nipple 22' of the coupling element 20'. It is pressed over the shoulder 23 of the coupling element 20' in the later securing case. Furthermore, in the interior of the press-fit holder 30', there is an abutment edge 34' at which both the insert 40' still to be described and the hose 50' abut. The wall thickness 31' of the press-fit holder is selected in this process such that it can withstand the force acting radially outwardly by the liquid flowing in the line 50'. The material thickness 31' is substantially thicker than the material thickness 41' of the insert 40'. The latter has a length 43' which is lower than the inner length 35' of the holder 30'. If the insert 40' is pushed into the press-fit holder 30' for assembly, a projecting rim thus results. The diameter 47' of the insert 40' is selected such that it can be pushed into the press-fit holder in a shape-matching manner. While a longitudinal movement of the insert 40' in the holder 30' is thus possible, no radial movement is possible. To permit an easy insertion of the insert 40' in assembly, it has a chamfer 46' at its front end. Structures are worked into its interior which act as hose gripping means. These can, as indicated here, be radially peripheral sawtooth-like ribs 42'. However, other structures and geometries are also possible such as triangular ribs or individual holding points.

On the assembly of the hose coupling 10' to the hose 50', the latter is generally peeled at one end. In this process, the upper rubber 51' of the hose 50' is removed with the exception of the wire net 52'. It may not be damaged in this process since it gives the inner hose 53' its compressive strength. The diameter 54' of the peeled hose is selected such that it is smaller than or coincidental with the inner diameter 45' of the insert. The same applies to the length 55' of the region to be peeled.

To assemble the hose coupling 10' in accordance with the invention, the insert 40' is first introduced into the press-fit holder 30' in the direction of the movement arrow 61'. The chamfer 46' should come to rest at the abutment edge 34'.The coupling element 20' is subsequently introduced into the holder in the direction of the movement arrow 60'. This takes place for so long until the abutment flange 24' is in contact with the press-fit holder 30'. As the last step the peeled section 55' of the hose 50' is pushed into the hose coupling 10' in the direction of the movement arrow 62'. The arrangement of the individual elements with respect to one another in the assembly case is shown in FIG. 5. In the assembly case shown there, all elements of the hose coupling 10' and the hose 50' are pushed into one another, but are not yet pressed with one another. The hose gripping means 42' thus does not yet engage into the hose 50'. The inner hose 53' furthermore only lies on the ribs 24' of the hose nipple 23' in shape-matching manner.

An external radial pressure, which is intended to be illustrated by the pressure arrows 37' drawn in FIG. 6, is required to mount the hose coupling 10' on the hydraulic hose secure against being pulled off. This external pressure 37' acting on the press-fit holder 30' results in a compression of both the press-fit holder and of the insert. The hose gripping means 42' is thereby pressed into the wire mesh 52' of the hose 50' and results in a firm connection between the hose connection piece 10' and the hose 50'. This state after the pressing of the holder 30' and of the insert 40' onto the hose 50' called the securing case is shown in FIG. 6. The toothed structure 42' of the insert 40', which acts as a hose gripping means, is pressed into the wire net 52' of the hose. The insert 40' and the holder 30' are connected in a shape-matched and force-matched manner after pressing.

The diameter of the press-fit holder is reduced on its radial compression. Since the sleeve can only be pressed together to a limited extent, this radial compression results in a flowing of the material in a longitudinal direction. The material of the body gives way to the external pressure by extension. On the pressing of the hose connection piece in accordance with the prior art, this lengthening of the press-fit holders results in the adjacent hose no longer lying ideally in the hose connection piece. In particular the hose end is frequently no longer at the abutment edge provided for it. The structures of the hose holding means furthermore migrate in the wire nets. To prevent this, the hose coupling in accordance with the invention is fitted with an insert 40' which, on the transition from the assembly case to the securing case, has a lower length change than the holder.

The substantial advantage results from this that only low axial forces are introduced onto the hose 50', whereby the service life of the hose 50' can be increased. In addition, no axial deformations of the hose 50', or only small axial deformations of the hose 50', occur in the region of the sealing groove, which has the result that the hose material pressed radially into the sealing groove is not deformed in the sealing groove, but instead has a good seating. The axial deformations of the press-fit holders in this aspect of the invention do not have to be absorbed, or not fully absorbed, by the hose material. They are not transferred, or only are insignificantly transferred, to the hose on the basis of the possible relative movement between the holder and the insert.

As FIG. 5 illustrates, the length 43' of the insert 40' is smaller than that of the internal bearing of the press-fit holder 30' which receives it. With a fully pushed-in insert, a marginal region thus arises with a length 48'. If the hose coupling 10' is now pressed by an external pressure 37', this results in a lengthening of the press-fit holder 30'. The length of the press-fit holder enlarges from the assembly length 32' to the securing length 33' by the reduction of the external diameter. The pressure 37' likewise results in a compression of the insert 40'. However, since this has a much lower wall thickness 41' than the press-fit holder, the length change is very much lower. In the ideal case, the length of the insert in the assembly case 43' coincides with that in the securing case 44'. As FIG. 6 illustrates, an increased length difference 49' between the length of the insert 44' and the internal length 33' of the press-fit holder results as a result of the pressing.

Since the press-fit holder 30' and the insert 40' are two separate components, they can expand independently of one another in the longitudinal direction. The length change of the press-fit holder 30' thus does not influence the position or length of the insert 40' on the pressing. The hose 50' remains in the position provided for it during the pressing procedure. The risk of the hose end no longer contacting the abutment flange 34' and thus of a leak being able to arise is substantially reduced. The hose holding means 42' furthermore no longer migrates in the wire net 52' so that an increased pressure security is achieved.

To achieve the lower length extension of the insert 40' in accordance with the invention on the transition from the assembly case to the securing case, the amount of material of the insert must always be lower than that of the holder. This can be achieved in that the insert has very thin walls. To achieve this, the insert 40' could have recesses on its external surface. Cut-outs in the insert would be equally feasible. In a further embodiment of the subject in accordance with the invention, the insert 40' would not have to be made in one piece, but could consist of a plurality of cylindrical sections. It would thereby be more easily possible to match the hose gripping means individually to the pattern of the wire net 52'. An improved connection between the hose connection piece and the hose would thus result.

In a further embodiment of the hose connection piece 10' in accordance with the invention, the hose gripping means 42' could also be compression folds of the insert 40'. In the manufacture of the insert, this could first consist of a cylindrical material, which is compressed along special compression folds by external effect so that projections can arise at the interior which later press into the hose fabric. However, it could also prove to be advantageous not only to use radially peripheral structures as the hose gripping means 42'. It would be possible to use individual projections projecting into the interior of the insert. In this process, pin-like, punch-like or pyramid-like projections are advantageous which bore into the fabric pattern on pressing.

In a further aspect of the hose coupling 10' in accordance with the invention, the insert 40' could also be a spirally bent material such as a spiral spring as shown in FIG. 4a or a lattice as shown in FIG. 4B. Since only a very low material amount would be pressed here, no significant change in length would likewise result. The spiral spring would have to have an external diameter which corresponds to that interior diameter of the press-fit holder 30'. A shape-matched introduction of the spiral spring into the press-fit holder would thus be possible. To achieve a better connection of the spirally shaped material to the wire net 52' of the hose 50', this could have a diamond-like cross-section. Depending on the application purpose, it could, however, also be advantageous to select a round, rectangular or triangular cross-section of the material for the insert.

To reduce costs in manufacture, both the press-fit holder 30' and the insert 40' could be made from free-cutting steel. Since the length change of the insert 40' on pressing is only low to negligible, it would no longer have to be baked in a strain-free manner prior to use. With hose connection pieces in accordance with the prior art with a multi-part design, this is not possible since the strains occurring inside the insert due to the pressing are so large that cracks occur. The cost-intensive baking can be dispensed with in the hose connection piece disclosed here on the basis of the low change in length of the insert in accordance with the invention.

The invention claimed is:

1. A hose coupling including a hose connection piece, having a region for the reception of an end of a hose, and having at least one peripheral sealing groove for the sealing of the hose connection, comprising a press-fit holder and an insert, wherein the insert rests in the press-fit holder;

wherein, in an assembly configuration, the insert and the press-fit holder enclose the hose connection piece with the hose pushed thereon;

wherein, in a securing configuration, the insert holds the hose;

wherein the hose coupling can be moved from the assembly configuration and the securing configuration by the application of external, radial pressure to the press fit holder;

and wherein a length change of the insert on transition from the assembly configuration to the securing configuration is lower than that of the holder, and a longitudinal movement of the insert is possible.

2. A hose coupling in accordance with claim 1, wherein the hose connection piece is a hose nipple or a hose nozzle.

3. A hose coupling in accordance with claim 1, wherein the sealing groove is located in the region of the end of the hose connection piece at which the hose is pushed onto the hose connection piece.

4. A hose coupling in accordance with claim 1, wherein the hose end is pressed on the hose connection piece by means of a press-fit holder, wherein the sealing groove is arranged relative to the press-fit holder such that the sealing groove is located in a region in which the press-fit holder exerts a minimum of no forces on the hose end acting in the axial direction of the hose connection piece.

5. A hose coupling in accordance with claim 1, wherein the sealing groove is provided in a region of the hose connection piece which is made in a cylindrical shape at its outer side.

6. A hose coupling in accordance with claim 5, wherein a conically tapering end region of the hose connection piece adjoins the cylindrical region.

7. A hose coupling in accordance with claim 1, wherein the region for the reception of the hose end has a section for the fixing of the pushed-on hose end and, adjacent to it, a region in which the sealing groove is provided for the sealing of the hose connection.

8. A hose coupling in accordance with claim 7, wherein the region in which the sealing groove is arranged is provided between the region which has the section for the fixing of the pushed-on hose end and the end region of the hose connection piece at which the hose is pushed onto the hose connection piece.

9. A hose coupling in accordance with claim 1, wherein the sealing groove has two substantially parallel walls.

10. A hose coupling in accordance with claim 9, wherein the walls extend perpendicular or substantially perpendicular to the surface of the region of the hose connection piece in which the sealing groove is arranged.

11. A hose coupling in accordance with claim 10, wherein the sealing groove has a U-shaped cross-section.

12. A hose coupling in accordance with claim 1, wherein the depth and the width of the sealing groove substantially coincide.

13. A hose coupling in accordance with claim 1, wherein the hose end of a hose is pressed onto the hose connection piece and the hose material of the hose end is received in the sealing groove of the hose connection piece.

14. A hose coupling in accordance with claim 1 wherein the hose connection piece is a tubular coupling element which can be connected at one end to a fitting and at the other end has a hose nipple for a hose and wherein the press-fit holder is cylindrical in shape.

15. A hose coupling in accordance with claim 14, wherein the insert rests in the press-fit holder and has hose gripping means at its interior surface which holds the hose in the securing configuration.

16. A hose coupling in accordance with claim 1, wherein the wall thickness of the insert is lower than that of the press-fit holder.

17. A hose coupling in accordance with claim 1, wherein the material amount of which the insert consists is lower than that of the press-fit holder.

18. A hose coupling in accordance with claim 1, wherein the insert has at least one part which is cylindrical.

19. A hose coupling in accordance with claim 1, wherein the insert is made up of a spirally shaped material and is made in the form of a spiral spring.

20. A hose coupling in accordance with claim 1, wherein the insert is a lattice.

21. A hose coupling in accordance with claim 1, wherein the internal length of the press-fit holder is longer than the total length of the insert.

22. A hose coupling in accordance with claim 15, wherein the hose gripping means comprises ribs on the periphery of the interior of the insert or inserts.

23. A hose coupling in accordance with claim 22, wherein the ribs have a triangular or sawtooth shaped cross-section.

24. A hose coupling in accordance with claim 15, wherein the hose gripping means is made up of individual projections projecting into the interior of the insert.

25. A hose coupling in accordance with claim 15, wherein the hose gripping means are compression folds of the insert.

26. A hose coupling in accordance with claim 15, wherein the structures of the hose gripping means are matched to a web pattern of a wire net of the hose.

27. A hose coupling in accordance with claim 1, wherein the insert(s) have a chamfer on the push-in side.

28. A hose coupling in accordance with claim 1, wherein the outer surfaces of the insert(s) have recesses; or wherein cut-outs are introduced into the outer surface of the insert(s).

29. A hose coupling in accordance with claim 19, wherein the spiral spring acting as an insert has a diamond-shaped cross-section.

30. A hose coupling in accordance with claim 1, wherein the press-fit holder and the insert comprise steel.

* * * * *